(12) United States Patent
Smith (10) Patent No.: US 7,604,734 B2
(45) Date of Patent: Oct. 20, 2009

(54) WATER FILTRATION SYSTEM

(75) Inventor: Dean Smith, Thousand Oaks, CA (US)

(73) Assignee: Chris Hammond, Thousand Oaks, CA (US), part interest ( * ) Notice: Subject to any disclaimer, the term of this patent is extended or adjusted under 35 U.S.C. 154(b) by 166 days.

(21) Appl. No.: 11/820,625

(22) Filed: Jun. 20, 2007

(65) Prior Publication Data
US 2008/0314811 A1    Dec. 25, 2008

(51) Int. Cl.
A01K 63/04    (2006.01)
C02F 3/04     (2006.01)
C02F 1/40     (2006.01)

(52) U.S. Cl. .............. 210/167.22; 210/151; 210/198.1; 210/416.2; 210/905; 119/260

(58) Field of Classification Search .............. 210/150, 210/151, 167.22, 167.25, 167.26, 167.27, 210/416.2, 905, 198.1; 119/259, 260, 261
See application file for complete search history.

(56) References Cited

U.S. PATENT DOCUMENTS

| | | | |
|---|---|---|---|
| 3,661,262 A * | 5/1972 | Sanders ............... | 210/167.22 |
| 4,035,299 A | 7/1977 | Vroeginday | |
| 4,036,756 A | 7/1977 | Dockery | |
| 4,212,724 A | 7/1980 | Moeglich | |
| 4,684,462 A * | 8/1987 | Augustyniak ............ | 210/97 |
| 4,896,800 A | 1/1990 | Corey | |
| 5,006,230 A * | 4/1991 | Votava et al. ............ | 210/94 |
| 5,054,424 A | 10/1991 | Sy | |
| 5,108,594 A | 4/1992 | Giovanetti et al. | |
| 5,176,824 A | 1/1993 | Willinger et al. | |
| 5,288,400 A * | 2/1994 | Phillips ................ | 210/151 |
| 5,292,431 A | 3/1994 | Romagnoli | |
| 5,567,315 A | 10/1996 | Weidenmann et al. | |
| 5,705,057 A * | 1/1998 | Hoffa .................. | 210/150 |
| 5,738,137 A | 4/1998 | Reinke | |
| 5,866,018 A | 2/1999 | Hyde et al. | |
| 5,881,753 A | 3/1999 | Bowling | |
| 5,965,016 A | 10/1999 | Suchowski et al. | |

(Continued)

FOREIGN PATENT DOCUMENTS

JP    9-294502 A  *  11/1997

(Continued)

OTHER PUBLICATIONS

WWW.DRSFOSTERSMITH.COM; Various filtrations systems; 7 pages.

*Primary Examiner*—Fred Prince
(74) *Attorney, Agent, or Firm*—Stetina Brunda Garred & Brucker (57) ABSTRACT

A filtration system for an aquarium is provided. The filtration system includes a gate chamber with a gate conduit positioned therein that transports unprocessed water from the aquarium. The gate chamber includes filtering media. The filtration system also includes a siphon chamber that is fluidly coupled to the gate chamber. There is a siphon conduit having a siphon conduit inlet at a first elevation within the siphon chamber, a siphon conduit outlet at a second elevation below the first elevation, and a crest at a third elevation above the first and second elevations. The siphon conduit empties into a catch basin, where the processed water is transported back to the aquarium.

16 Claims, 10 Drawing Sheets

U.S. PATENT DOCUMENTS

| | | |
|---|---|---|
| 6,585,888 B2 | 7/2003 | Axelrod |
| 6,869,530 B1 | 3/2005 | Venezia |
| 6,902,666 B1 | 6/2005 | Foronda, Jr. |
| 7,001,509 B1 | 2/2006 | Lin |
| 7,033,491 B2 | 4/2006 | Chang |
| 7,094,335 B2 | 8/2006 | Patron |

FOREIGN PATENT DOCUMENTS

JP    2002-159241 A    *   6/2002

* cited by examiner

WATER FILTRATION SYSTEM

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present invention relates generally to aquarium filtration devices. More particularly, the present invention relates to combination biological, mechanical and chemical filtration systems that simulate natural tidal conditions.

2. Related Art

Keeping fish and other marine life in a home aquarium is a popular hobby with varying levels of complexity and sophistication. At the simplest level, there are freshwater aquaria with fish such as guppies, goldfish, and the like, though other less common species such as angelfish and rainbowfish may also be kept. In addition to fish, such freshwater aquaria may also include aquatic plants for environmental balance and aesthetic purposes. The aquatic plants typically foster growth of beneficial bacteria and other microorganisms that facilitate aquarium health. At the more complex levels, exotic and colorful saltwater fish may be kept, along with appropriate aquatic plants. The appearance and longevity of such a saltwater aquarium may be enhanced by the addition of living rock, that is, structures composed of calcium limestone and decomposing coral skeleton that foster the growth of algae, worms, and other small marine organisms. Furthermore, a reef ecosystem may be implemented by the addition of living coral.

The environment within the aquarium would ideally have an ecological balance identical to that of the natural habitat of the life forms therein, but sustained and consistent balance is practically impossible due to the limited size thereof. The limited volume of water in typical hobbyist aquaria results in a reduction of its capacity to absorb systemic shocks such as death or the addition of a fish or plant, and further leads to a deterioration of long-term ecological stability. Accordingly, maintenance of a proper chemical and biological balance represents a significant challenge in keeping an aquarium. More particularly, proper nutrient cycles must be maintained, including the oxygen cycle, the nitrogen cycle, the sulfur cycle, and so forth. Sufficient levels of oxygen must be present in the aquarium water for respiration, and the resultant carbon dioxide must be expelled. Further, waste products expelled by fish and aquatic plants resulting from consumed food and other nutrients must be removed. Unconsumed nutrients and food particles may also remain in the water that may have an adverse affect on the ecology of the aquarium, and so such compounds likewise must be removed. Secondary waste products may also be generated by bacteria that ingest the primary waste from the fish. The aforementioned impurities may be harmful, and even lethal to the fish and other organisms in the aquarium at high concentrations.

Of particular concern with respect to aquarium maintenance is the nitrogen cycle, which relates to the breakdown process of nitrogen waste. In conjunction with proper feeding, appropriate maintenance of the nitrogen cycle is deemed sufficient for most aquaria because the other nutrient cycles are essentially maintained in equilibrium so long as the nitrogen cycle is at equilibrium. As understood, ammonia or nitrogenous waste is produced by fish directly or via feces, as well as by plants, animal matter, and uneaten food that is decomposing. In a natural environment, ammonia is neutralized by a two-step process known as nitrification. A first type of beneficial bacteria known as nitrifiers, or Nitrosomonas, metabolizes the ammonia from the water and produces nitrite. Nitrite is also understood to be toxic to fish in high concentrations, though not as toxic as ammonia. A second type of beneficial bacteria, the Nitrospira, converts the nitrite to nitrate, which is harmless to the fish. In addition to the bacteria, aquatic plants may also convert ammonia to nitrate. Both of these types of bacteria are aerobic, and thus depend upon a supply of oxygen.

Considering the limited ecology of a typical home aquarium, relying upon the above-described biological processes to occur naturally without human intervention is largely inadequate. In this regard, wide varieties of biological filtration systems have been conceived and are known in the art. Generally, such filtration systems foster the growth of the aforementioned bacteria by providing biomedia with a large surface area upon which the bacteria may grow. Typical biological filters are of the wet/dry type, where water from the aquarium is pumped and trickled over the biomedia. This oxygenates the water, thereby providing sufficient oxygen for the aerobic bacteria to nitrify the ammonia present in the water.

Before the water from the aquarium contacts the biomedia, it may undergo mechanical filtration to remove large debris and contaminants. This is done because the biological filter must be clear of large debris that would impede the flow of water and reduce oxygenation efficiency. The most common type of mechanical filter utilizes gravel and/or synthetic fibers that trap solid waste products.

In addition to the foregoing mechanical filtering for debris, the water from the aquarium may undergo a chemical filtration process. Such chemical filters remove or deactivate organic substances before breaking down into nitrogen waste, thus decreasing the filtration load upon the biological filter. Activated carbon and ion-exchange resin filters may be utilized to this end. Alternatively, yet increasingly, devices known as protein skimmers, or foam fractionators are used. A conventional protein skimmer includes a column of water with fine bubbles passed therethrough. Protein and other compounds bind to the air in the bubbles, and are carried to the top of the column. The resulting foam is collected, allowed to condense, and subsequently removed.

Conventional aquaria utilize one or more of the above-described mechanical, chemical, and biological filtration systems, either alone or in combination, depending on the sensitivity of the fish and marine life being kept. Existing systems, however, are configured to filter water at a consistent rate, and cannot accurately simulate ecological conditions in tidal pools. In addition to the Nitrosomonas and Nitrospira bacteria, there are other types of bacteria that facilitate aquarium health. Some types have higher effectiveness when mostly submerged, while others have higher effectiveness when in contact with the air. A natural tidal pool environment is capable of accommodating all such bacteria, yet conventional filtration systems are unable to do so, leading to inefficient or unsatisfactory bacteria cultivation.

Accordingly, there is a need in the art for an aquarium filtration system including biological and chemical filtration components that simulate natural tidal conditions to accommodate a wide range of marine life. There is also a need in the art for a cyclical aquarium filtration system with a minimal number of moving parts for maintenance and cleaning ease.

BRIEF SUMMARY

According to one embodiment of the present invention, there is provided a filtration system for an aquarium. The aquarium may have an aquarium inlet for processed water, and an aquarium outlet for unprocessed water. The filtration system may include a gate chamber, with a gate conduit positioned therein and being in fluid communication with the aquarium outlet. The gate chamber may include filtration media. The gate conduit may define a gate conduit outlet and a gate conduit inlet. Additionally, the filtration system may include a siphon chamber that is fluidly coupled to the gate chamber. There may be a siphon conduit having a siphon conduit inlet at a first elevation within the siphon chamber. The siphon conduit may have a siphon conduit outlet at a second elevation below the first elevation, as well as a crest at a third elevation above the first elevation and the second elevation. The filtration system may further include a catch basin that is in fluid communication with the siphon conduit for collecting the processed water from the siphon chamber for recirculation back to the aquarium. In one aspect of the present invention, the water from aquarium collects within the gate chamber upon conveyance thereto via the gate conduit. In another aspect, the water in the siphon chamber is discharged into the catch basin upon the water level in the siphon chamber surpassing the third elevation. Further, the water in the siphon chamber stops discharging into the catch basin upon the water level in the siphon chamber reaching a level lower than the first elevation.

The cyclical discharge/recharge cycle is contemplated to simulate the natural tidal conditions founds on coastal areas, with a various strata of bacteria being cultivatable in the gate chamber. The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of the presently preferred embodiment of the invention, and is not intended to represent the only form in which the present invention may be constructed or utilized. The description sets forth the functions of the invention in connection with the illustrated embodiment. It is to be understood, however, that the same or equivalent functions and may be accomplished by different embodiments that are also intended to be encompassed within the scope of the invention. It is further understood that the use of relational terms such as first and second, top and bottom, and the like are used solely to distinguish one from another entity without necessarily requiring or implying any actual such relationship or order between such entities.

Figure 1:
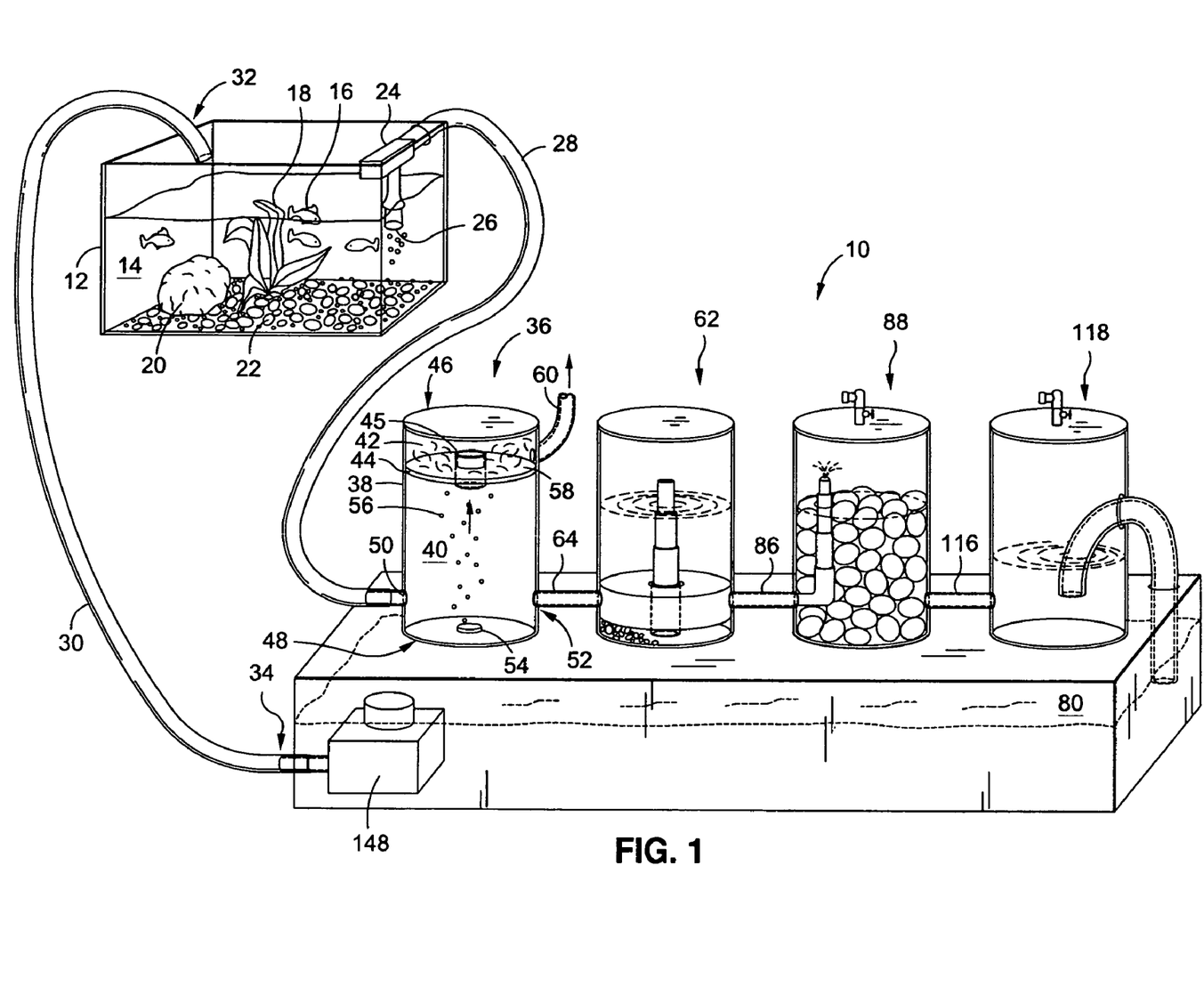
FIG. 1 is a perspective view of a filtration system for an aquarium in accordance with a first embodiment of the present invention including a protein skimmer, an overflow chamber, a gate chamber, a siphon chamber, and an catch basin.

FIG. 1 illustrates a filtration system 10 in accordance with a first embodiment of the present invention. The filtration system 10 is utilized in conjunction with an aquarium 12 that is generally cuboid in shape and defines an interior that holds water 14. As will be appreciated by one of ordinary skill in the art, the aquarium 12 need not be limited to the cuboid configuration shown in FIG. 1, and may have a variety of shapes such as bowls, irregular polyhedra, and the like. The aquarium 12 may be constructed of glass, acrylic, or other transparent material such that the interior is visible. A variety of organisms such as fish 16 or aquatic plants 18 may be contained in and supported by the aquarium 12. Additionally, other non-living structures such as a rock 20 and a gravel bed 22 may also be disposed in the aquarium 12. It is understood that the water 14 may be saltwater, freshwater, or brackish water, depending upon the species desired to be kept.

As indicated above in the background, the water 14 becomes contaminated with solid debris such as dirt and unconsumed food, as well as soluble organic waste products, nitrogen waste, and the like. The water 14 including such contaminants must be removed from the aquarium 12, while clean water must be cycled back into the same. It is contemplated that such contaminant removal process and water recycling is performed by the filtration system 10. As utilized herein, the term unprocessed water refers to the water 14 that contains the aforementioned contaminants, while the term processed water refers to the water 14 that has had such contaminants removed by the filtration system 10.

The first step in the process, as indicated above, involves the removal of the unprocessed water 14 from the aquarium 12 by an electric pump 24. The pump 24 includes a partially submerged intake port 26, though which the water 14 is withdrawn. The pump 24 is also coupled to an outgoing conduit 28 that links the pump 24, and thus the aquarium 12, to the filtration system 10. The intake port 26 is also referenced herein as the aquarium outlet. As will be described in further detail below, the aquarium 12 is replenished with the processed water 14 conveyed from the filtration system 10 via an incoming conduit 30. The incoming conduit 30 defines a first conduit end 32 engaged to the aquarium 12, and a second conduit end 34 engaged to the filtration system 10. The first incoming conduit end 32 is also referenced herein as the aquarium inlet. It is understood that the aquarium inlet feeds the processed water 14 from the filtration system 10 back into the aquarium 12, while the aquarium outlet withdraws the unprocessed water 14 from the aquarium, and transports the same to the filtration system 10. Alternatively, as will be described in further detail below, the water 14 may be transported between the filtration system 10 and the aquarium 12 via gravity feed.

As indicated above, the outgoing conduit 28 is engaged to the filtration system 10 for transporting the unprocessed water 14 from the aquarium. In further detail, as shown in the illustration of a first embodiment of the present invention in FIG. 1, the outgoing conduit 28 is engaged to a protein skimmer 36. The protein skimmer 36 is generally defined by a column 38 segregated into a reaction chamber 40 and a collection chamber 42 by a partition 44. Further, the column 38 is defined by a top end 46 and an opposed bottom end 48. Generally, the collection chamber 42 is disposed towards the top end 46, while the reaction chamber 40 is disposed towards the bottom end 48. The column 38, particularly in the portion of the reaction chamber 40, defines a skimmer inlet 50 and a skimmer outlet 52. The skimmer inlet 46 is mated to the outgoing conduit 28, and the unprocessed water 14 from the aquarium 12 enters the protein skimmer 36 therethrough. At the bottom end 48, an air stone 54 generates bubbles 56 that travel up the reaction chamber 40 to the collection chamber 42. The bubbles 56 become foam 58 in the collection chamber 42 upon passing through an aperture 45 defined by the partition 44. The foam 58 is removed from the collection chamber 42 via a waste conduit 60. It is understood that protein and other organic impurities dissolved in the water 14 are attracted to the bubbles 56, and are removed therefrom as the bubbles 56 enter into the collection chamber 42. In order to ensure proper removal of the bubbles 56 from the reaction chamber 40 to the collection chamber 42, the water level in the reaction chamber 40 preferably reaches the partition 44. In this regard, the pump 24 is configured to supply a sufficient volume of water to the protein skimmer 36 to maintain such appropriate level. Although the foregoing illustrates one type of protein skimmer using a particular type of bubble-generating modality, it will be appreciated by those having ordinary skill in the art that any other type of protein skimmer and/or bubble-generation technique may be readily substituted.

Figure 2:
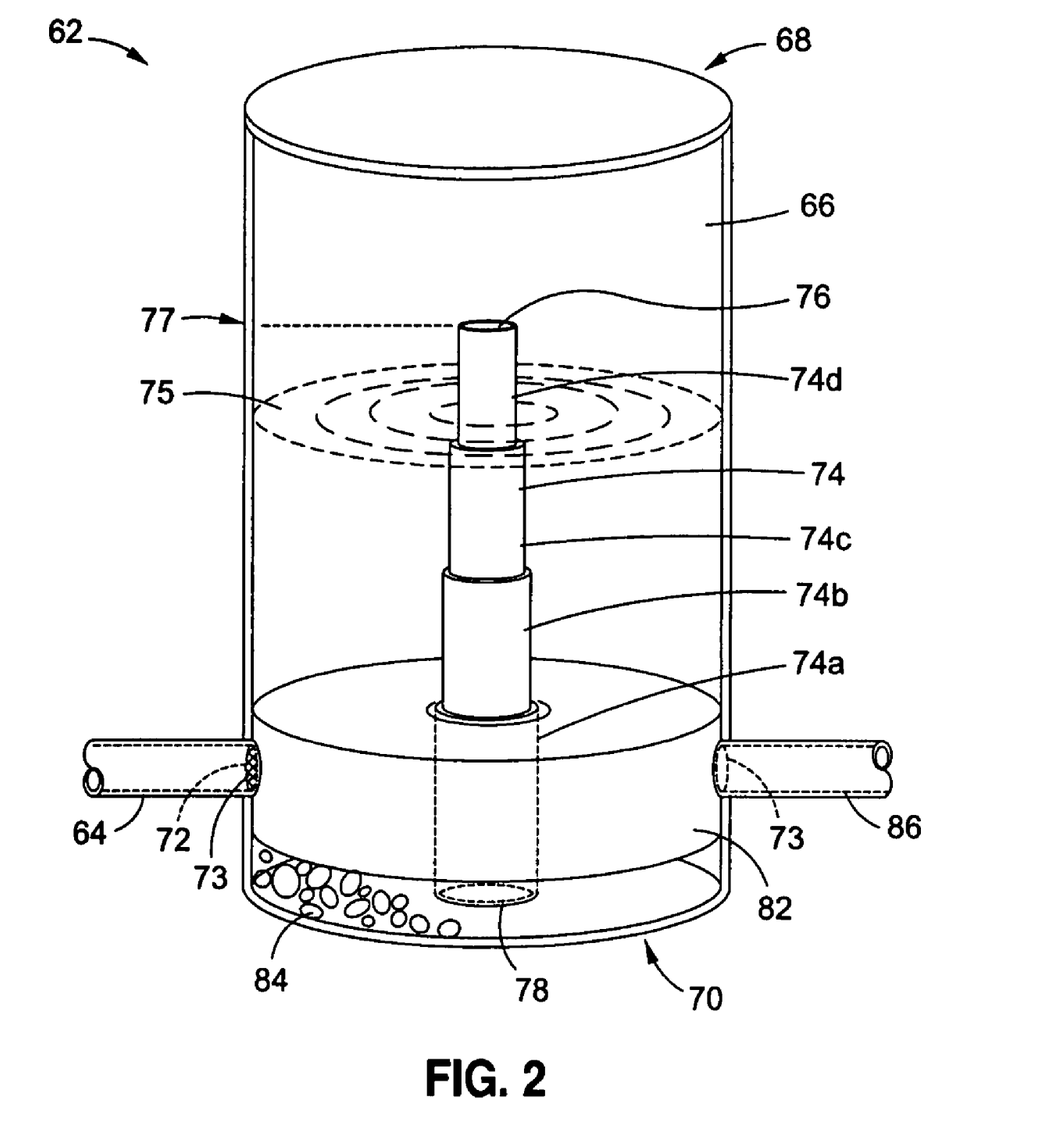
FIG. 2 is a perspective view of the overflow chamber including an overflow conduit.

According to one embodiment of the present invention, the water 14 is transported to an overflow chamber 62 via a first inter-chamber conduit 64 after being processed by the protein skimmer 36. With reference to FIG. 2, the overflow chamber 62 is generally defined by a column 66 having a closed top end 68 and an opposed closed bottom end 70. The water 14 from the protein skimmer 36 enters through an overflow chamber inlet 72, which is engaged to the first inter-chamber conduit 64. The overflow chamber inlet 72 may be partially covered with screen filter 73 for preventing the passage of large particulate matter. An overflow conduit 74 extends into the overflow chamber 62, and defines an upper inlet 76 and a lower outlet 78. The upper inlet 76 is an interface to the overflow chamber 62. In further detail with reference to FIG. 1, the lower outlet 78 is coterminous with a catch basin 80. Thus, the overflow chamber 62 is in indirect fluid communication with the catch basin 80 via the overflow conduit 74. When the water level 75 in the overflow chamber 62 exceeds the height 77, the water 14 flows into the overflow conduit 74, and therefore into the catch basin 80.

The overflow chamber 62 is in fluid communication with the protein skimmer 36, and thus the water level 75 in the overflow chamber 62 is essentially equivalent to the water level in the protein skimmer 36. As indicated above, the pump 24 supplies a sufficient volume of the water 14 to maintain a constant water level in the protein skimmer 36. The overflow chamber 62, via the overflow conduit 74, discharges any excess water being pumped into the protein skimmer 36. The overflow conduit 74 is positioned such that the upper inlet 76 is at essentially the same height as the aperture 45 in the protein skimmer 36. Therefore, by limiting the height to which the water level 75 may rise within the overflow chamber 62, the water level in the protein skimmer 75 is limited and the water 14 is prevented from overflowing into the collection chamber 42. The volume of the water being circulated by the filtration system 10 is also controlled by the height of the overflow conduit 74. Along these lines, the height 77 of the overflow conduit 74 is contemplated as being adjustable. According to one embodiment of the present invention, the overflow conduit 74 is telescoping, that is, comprised of multiple segments 74a, 74b, 74c, 74d, each successive segment being smaller in circumference than the previous segment and engaged thereto. Other adjustable-height overflow conduits 74 are also contemplated, such as those that can be twisted transversely in relation to the column 66, and the like, and any such variations are deemed to be within the scope of the present invention.

Though the overflow chamber 62 may be left empty as depicted in FIG. 1, it may include a variety of functional features as illustrated in FIG. 2. In accordance with one embodiment of the present invention, the overflow chamber 62 includes a filtration module 82 contained therein. It is contemplated that the filtration module 82 removes particulate matter in the water 14 flowing therethrough. It is also contemplated that the filtration module 82 is a chemical filter comprised of activated charcoal, wool fiber, and the like. The surface area provided by such materials provides a location to which chemical impurities in the water 14 bind. Moreover, the overflow chamber 62 may contain a buffering module 84 for adjusting and stabilizing the pH level of the water 14 flowing therethrough.

With reference to FIGS. 1 and 2, the water 14 in the overflow chamber 62 exits through an overflow chamber outlet 73. The overflow chamber outlet 73 is coupled to a second inter-chamber conduit 86. The second inter-chamber conduit 66 is also coupled to a gate chamber 88, thereby fluidly linking the overflow chamber 62 to the gate chamber 88.

Figure 3:
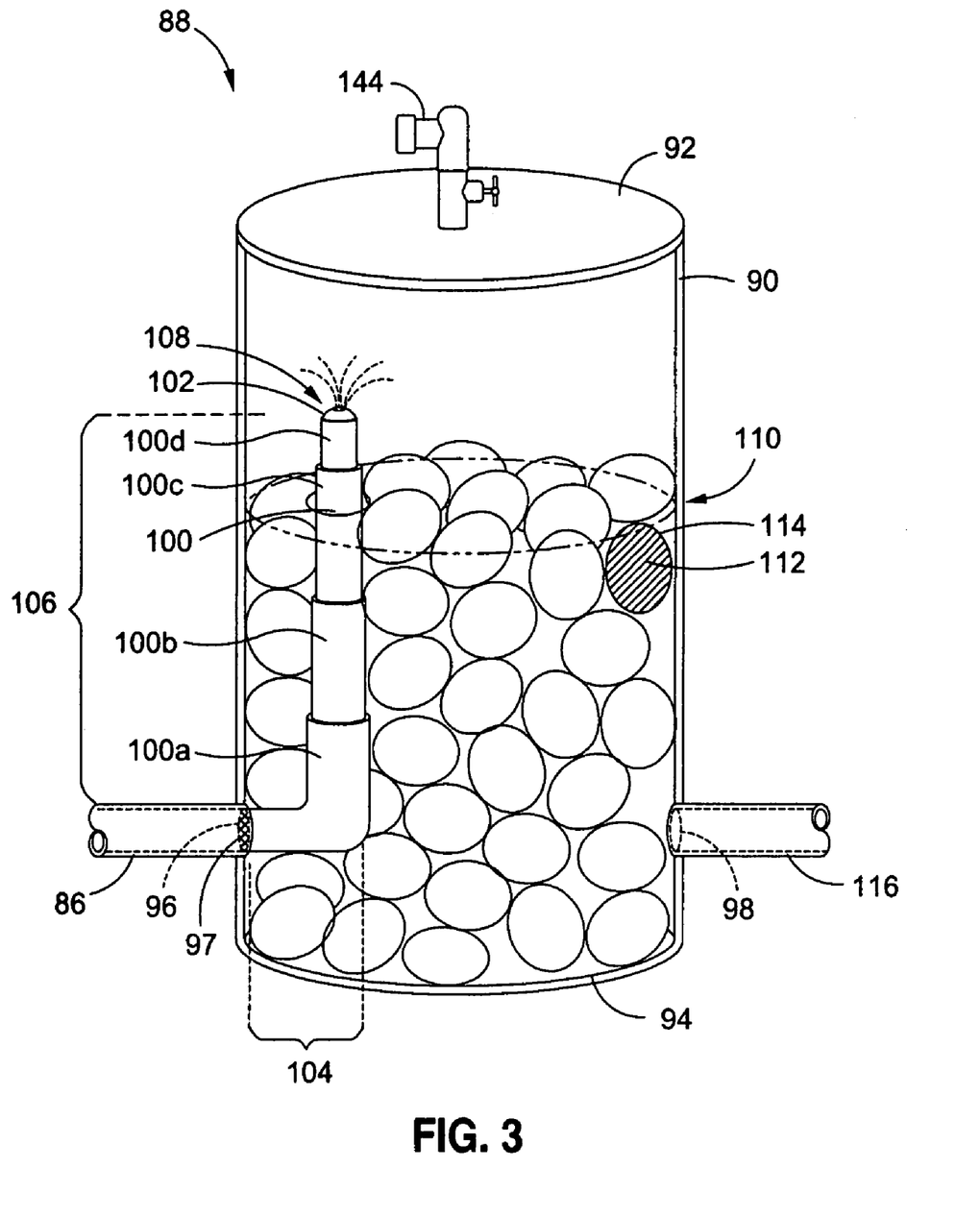
FIG. 3 is a perspective view of the gate chamber including a gate conduit.

As shown in greater detail in FIG. 3, the gate chamber 88 is defined by a cylindrical column 90 with a closed top end 92 and a closed bottom end 94. The column 90 defines a gate chamber inlet 96 and a gate chamber outlet 98 in proximity to the bottom end 94. The gate chamber inlet 96 may be partially covered by a screen filter 97, which prevents the passage of large particulate matter while allowing the passage of the water 14. The gate chamber 88 also includes a gate conduit 100 that defines a gate conduit outlet 102. Along these lines, the gate chamber inlet 96 may also be referenced herein as the gate conduit inlet, as the second inter-chamber conduit 86 is coupled to the gate conduit 100. It is understood that the gate conduit 100 is in fluid communication with the overflow chamber 62 and the protein skimmer 36, and thus, with the intake port 26 of the aquarium 12.

According to one aspect of the present invention, the protein skimmer 36, the overflow chamber 62, and the gate chamber 88 need not be connected sequentially as described above. Both the protein skimmer 36 and the overflow chamber 62 may be directly connected to the gate chamber 88. Indeed, it is understood that the protein skimmer 36 and the overflow chamber 62 are optional, and the functionality of such components may be provided by devices exterior to that of the filtration system 10. In such embodiments, the gate chamber inlet 96 is understood to be coupled to the aquarium outlet.

The gate conduit 100 defines a horizontal section 104 and a vertical section 106 perpendicularly oriented relative to the horizontal section 104. As mentioned above, the gate chamber inlet 96/gate conduit inlet is disposed in proximity to the bottom end 94. Therefore, the horizontal section 104 of the gate conduit 100 is similar disposed in proximity to the bottom end 94. The gate conduit outlet 102, on the other hand, is disposed within the gate chamber 88 in proximity to the top end 92. More particularly, the vertical section 106 of the gate conduit 100 extends towards the top end 92 to a predetermined height 108 relative to the column 90.

It is understood that the water 14 from the overflow chamber 62 is steadily discharged into the gate chamber 88 via the gate conduit 100. In order for the water 14 to reach the gate conduit outlet 102, the water level 75 in the overflow chamber 62, and thus the protein skimmer 36, is preferably maintained at a height higher than the predetermined height 108. The water 14 collects within the gate chamber 88, and has a varying water level 110. It is contemplated that the gate conduit 100 is also adjustable like the overflow conduit 74, and may likewise be comprised of multiple segments 100a, 100b, 100c, 100d, with each successive segment being smaller in circumference than the previous segment and engaged thereto. Additionally, like its counterpart, there are alternative configurations contemplated for the overflow conduit 100 such as those pivotable about the axis of the horizontal section 104. As will be described in further detail below, the height 108 of the overflow conduit controls the timing and flow of the water 14 being cycled through the filtration system 10.

The water 14 discharged through the gate conduit outlet 102 collects within the gate chamber 88. As mentioned above, the rate of discharge into the gate chamber 88 is substantially constant, though as will be described in further detail below, water level 110 is variable. The water 14 in the gate chamber 88 comes into contact with a plurality of bio-media elements 112 disposed therein. It will be understood by those having ordinary skill in the art that the bio-media elements 112 may be bio-balls, which include numerous perforations 114 upon which beneficial, nitrifying bacteria may grow. As indicated above in the background, these nitrifying bacteria include the Nitrosomonas bacteria, which metabolize the ammonia present in the water 14 into nitrite, as well as the Nitrospira bacteria, which convert the nitrite to nitrate. It is understood that as the water 14 trickles through the perforations 114, the bacteria concurrently contact the air and the water 14 for the aforementioned ammonia decomposition to occur, since the bacteria are aerobic, that is, requires oxygen to function. Essentially, the gate chamber 88 serves as a wet/dry filter. The processed water 14 exits the gate chamber 88 via the gate chamber outlet 98, which is engaged to a third inter-chamber conduit 116.

Figure 4:
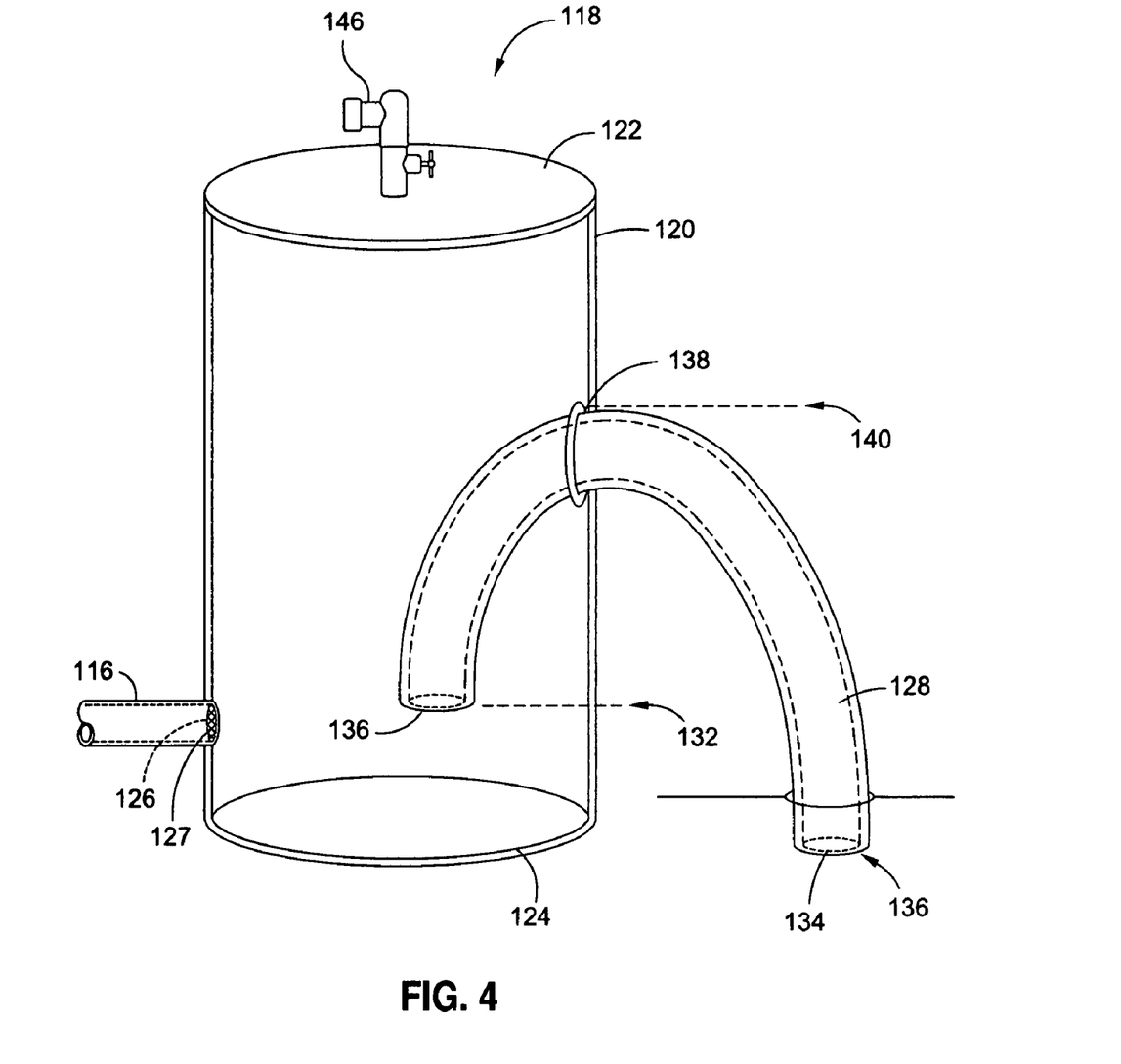
FIG. 4 is a perspective view of the siphon chamber including a siphon conduit.

With reference to FIG. 4, upon exiting the gate chamber 88, the water 14 is drawn into a siphon chamber 118. The siphon chamber 118 is likewise defined by a cylindrical column 120 having a closed top end 122 and a closed bottom end 124. The column 118 defines a siphon chamber inlet 126, to which the third inter-chamber conduit 116 is connected. The siphon chamber inlet 126 is provided with a screen filter 127 to prevent the passage of large particulate matter. Generally, as shown in FIG. 1, the gate chamber 88 is fluidly coupled to the siphon chamber 118. The siphon chamber 118 has inserted therein a siphon conduit 128 defines a siphon conduit inlet 130 at a first elevation 132 within the siphon chamber 118. The siphon conduit 128 further defines a siphon conduit outlet 134 at a second elevation 136 below the first elevation 132, and a crest 138 at a third elevation 140 above the first elevation 132 and the second elevation 136. Referring to FIG. 1, the siphon conduit 128 is in communication with the catch basin 80, and the processed water 14 accumulating in the siphon chamber 118 is collected in the catch basin 80 for recirculation back to the aquarium 12. In this regard, the siphon conduit outlet 136 may be either coterminous with or extended into the catch basin 80.

As indicated above, the siphon chamber 118 is in fluid communication with the gate chamber 88, and so the water level 110 in the gate chamber 88 is substantially equivalent to water level 142 in the siphon chamber 118. Thus, it is to be understood that when referring to a change in the water level 110 in the gate chamber 88, a change in the water level 142 in the siphon chamber 118 is also implied. With further reference to the combined illustration of the gate chamber 88 and the siphon chamber 118 as shown in FIG. 5a-5d, and now particularly to FIG. 5a, the filtration system 10 is in a recharge cycle. The water level 142 in the siphon chamber 118 is lower than the third elevation 140, but it is rising as the water 14 is discharged into the gate chamber 88 via the gate conduit 100. As the water level 142 in the siphon chamber 118 increases, the siphon conduit 128 accordingly fills with water through the siphon conduit inlet 130. Essentially, the siphon is being primed.

Figure 5A:
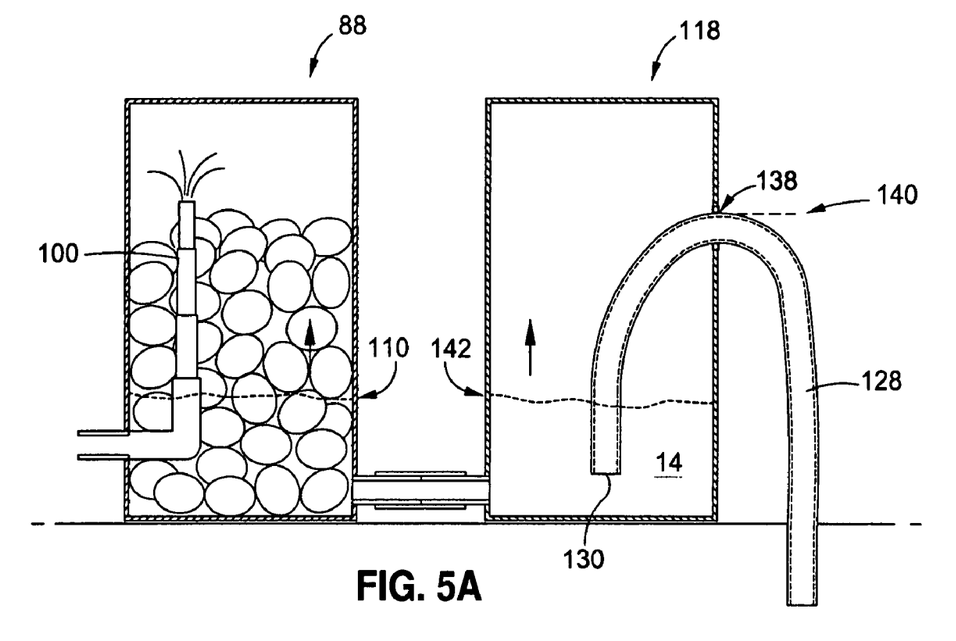
FIG. 5a is a cross-sectional view of the gate chamber and the siphon conduit in a recharge cycle, in which the water levels in the gate chamber and the siphon chamber are rising.
Figure 5B:
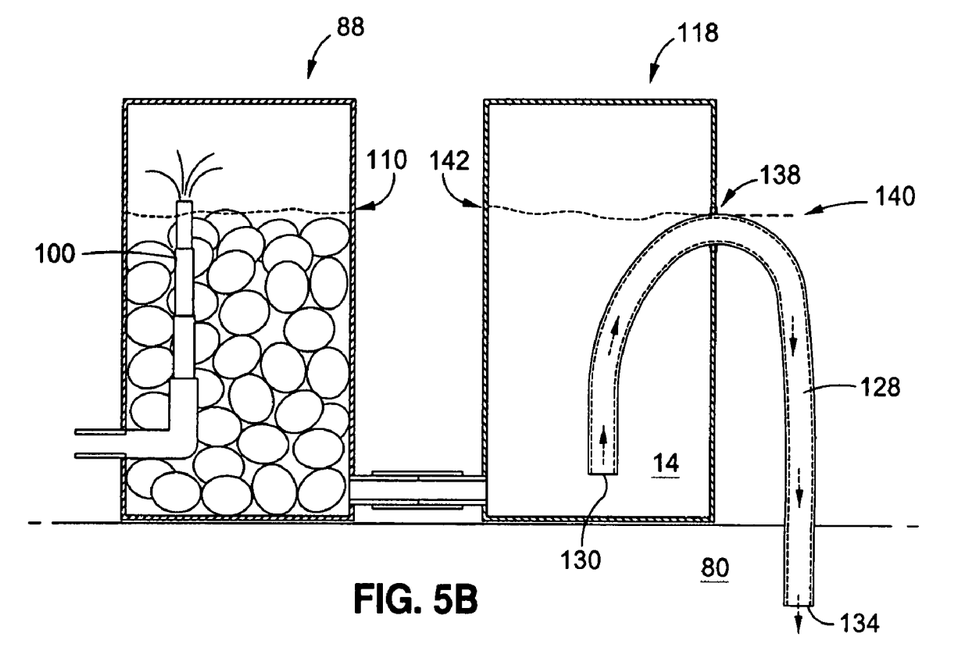
FIG. 5b is a cross-sectional view of the gate chamber and the siphon conduit with the water level reaching a crest of the siphon conduit and activating the siphon.

Referring to FIG. 5b, when the water level 142 in the siphon chamber 118 exceeds the third elevation 140, the siphon is activated, and the discharge cycle initiates. The water 14 begins flowing through the siphon conduit inlet 130, up through the crest 138, and down to the siphon conduit outlet 134. The water 14 discharges in the catch basin 80. As will be understood by those having ordinary skill in the art, the hydrostatic force of the water 14 pulls the water 14 up to the crest 138, and flows down the siphon conduit 128 by gravitational force.

Figure 5C:
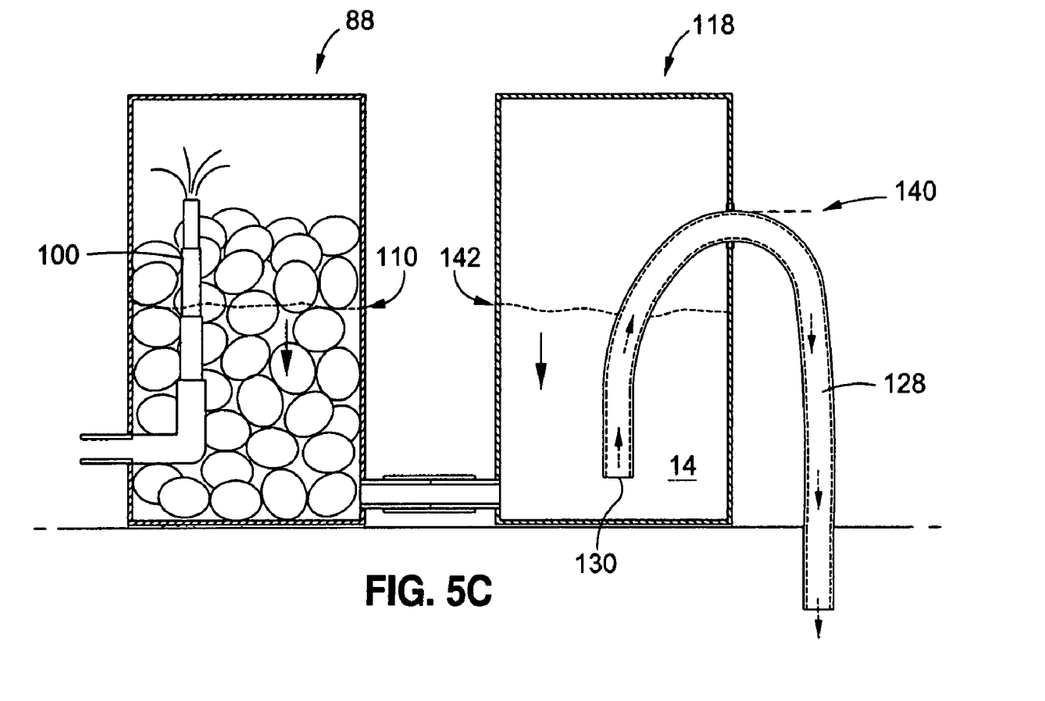
FIG. 5c is a cross-sectional view of the gate chamber and the siphon conduit with the siphon activated and the water levels lowering in a discharge cycle.
Figure 5D:
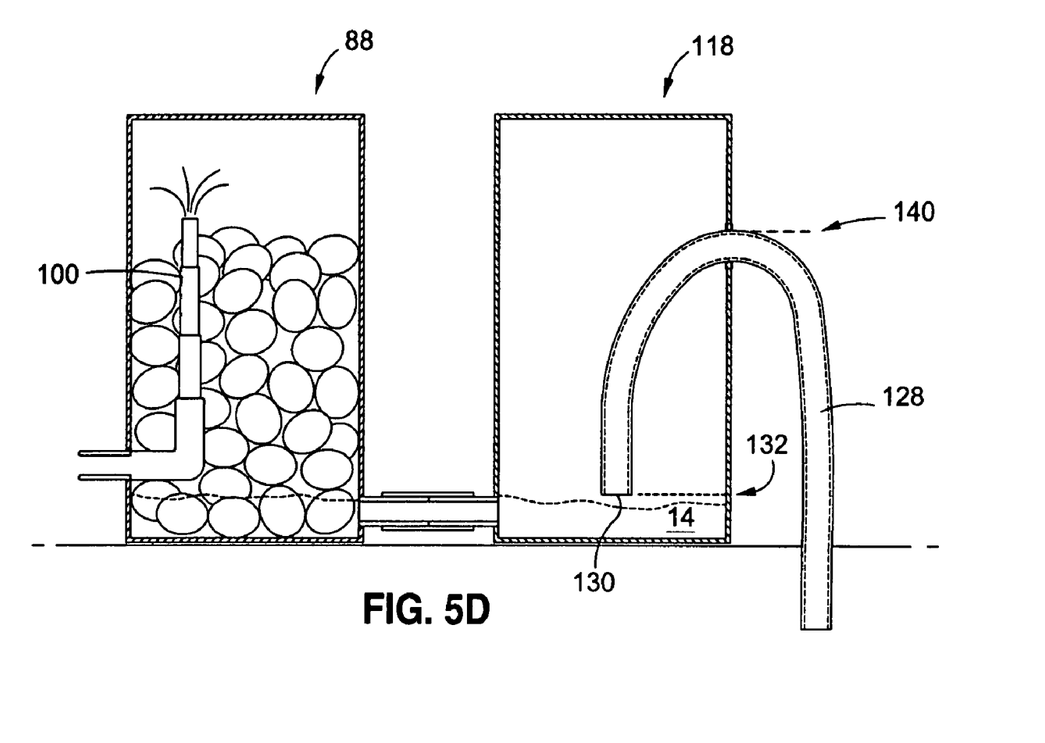
FIG. 5d is a cross-sectional view of the gate chamber and the siphon conduit with the siphon deactivated after concluding the discharge cycle.

As shown in FIG. 5c, the water level 142 in the siphon chamber 118 continues to decrease during the depicted discharge cycle, as the siphon remains active. The water 14 in the siphon chamber 118 continues to be drawn out through the siphon conduit 128 and into the catch basin 80. With reference to FIG. 5d, the siphon deactivates when the water level 142 is below the first elevation 132, and does not re-initiate until the siphon conduit 128 is re-primed, that is, until the water level 142 again reaches the third elevation 140. Because the water 14 is no longer being discharged, the water 14 flowing through the gate conduit 100 and into the gate chamber 88 can accumulate therein.

Preferably, the volume of water being discharged into the gate chamber 88 via the gate conduit 100 is less than the volume of water being discharged through the siphon conduit 128. This way, the above-described cyclical discharging/recharging sequence may be maintained. It is contemplated that the diameter of the siphon conduit 128 and the gate conduit 100 may be modified to adjust the volume and flow rate of water during the recharge cycle and the discharge cycle, respectively. Additionally, the size of the gate chamber 88 and the siphon chamber 118 may likewise be adjusted. With reference to FIG. 3, further adjustment to the recharge and discharge times may be provided by a first one-way valve 144 disposed on the top end 92 of the gate chamber 88, and a second one-way valve 146 disposed on the top end 122 of the siphon chamber 118. The adjustable one-way valves 144, 146 may be opened or closed to create negative or positive pressure during discharge and recharge cycles.

According to an aspect of the present invention, it is envisioned that by mimicking natural tidal patterns, an environment closely approximating the same may be created in the aquarium 12, including the various strata of bacteria. As indicated above in the background, there are some varieties of bacteria that are better suited for a submerged environment, while others are not. In the natural environment, bacteria of all types thrive because of the tidal surges; the bacteria that are better suited for a submerged environment develop in deeper areas that are more frequently underwater, while those that are not develop in shallow areas that are less frequently underwater and drier. Based on the foregoing description of the gate chamber 88, the siphon chamber 118, and the functions provided thereby, it will be recognized that the gate chamber 88 mimics the natural tidal environment, with the bio-media elements 112 disposed towards the bottom end 94 being more accommodating for those bacteria suited for submerged environments, while the bio-media elements 112 disposed toward the top end 92 being more accommodating for those bacteria suited for drier environments. It is understood that the bottom end 94 is submerged under the water 14 for a greater period of time than the top end 92, considering that once the water level slowly reaches the third elevation 140, the siphon is activated and immediately begins draining the siphon chamber 118 and the gate chamber 88.

With reference to FIG. 1, after the processed water 14 is discharged into the catch basin 80, a sump pump 148 recirculates the same back to the aquarium 12 via the incoming conduit 30. Prior to recirculation, the water 14 may be processed again with a second filtration medium or second buffer medium disposed in the catch basin 80. It is contemplated that the sump pump 148 maintains a constant flow of processed water back to the aquarium 12, as unprocessed water is extracted from the same and conveyed to the filtration system 10. In one embodiment, the flow volume of the sump pump 148 determines the cycle rate of the filtration system 10. The sump pump 148 slightly raises the water level in the aquarium 12, upon which the water 14 overflows into the outgoing conduit 28 and is conveyed to the protein skimmer 36. Accordingly, the water level on the aquarium 12 remains essentially unchanged, that is, it does not rise and fall more than 1% of the height of the rise and fall in water level of the siphon chamber 118. Other tolerances are also contemplated, however, and may be as low as 0.1%, up to 5% or more, depending upon modifications that are within the capabilities of one having ordinary skill in the art.

Figure 6:
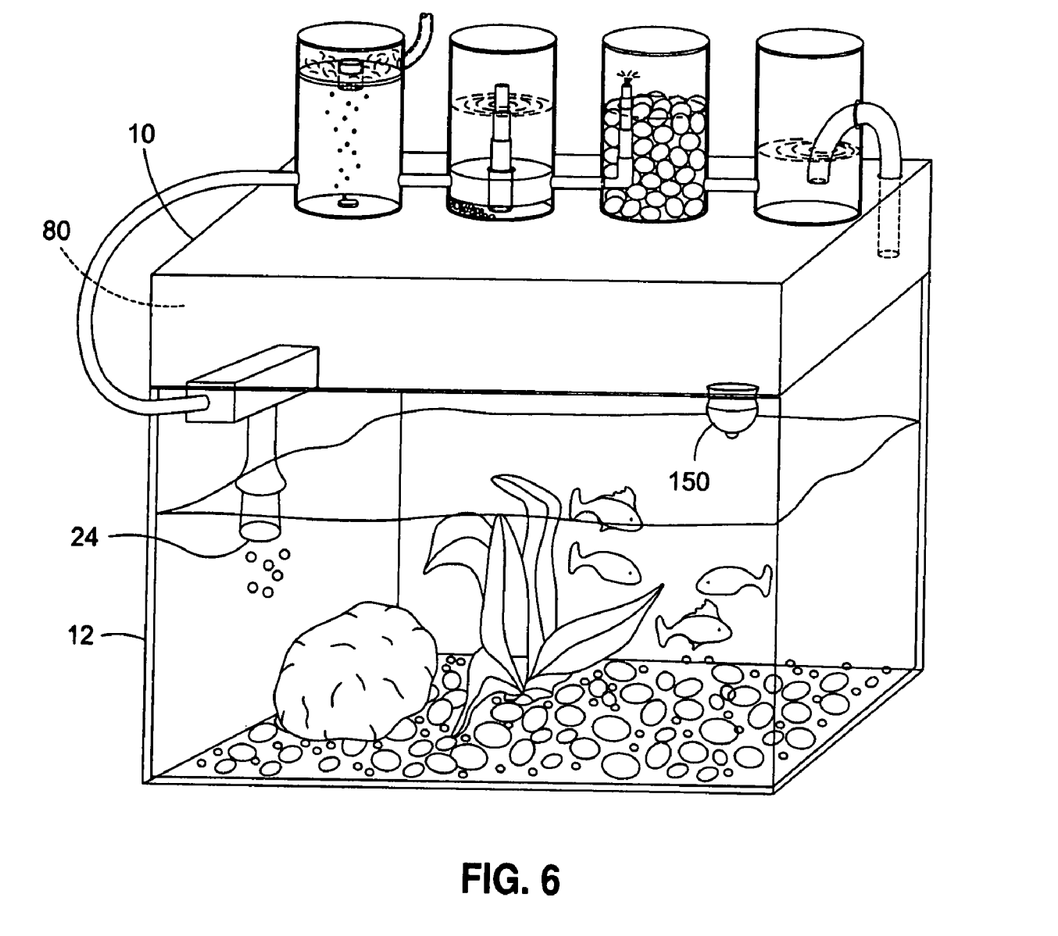
FIG. 6 is a perspective view of the filtration system installed above the aquarium, where a gravity-based replenishment modality is utilized.
Figure 7:
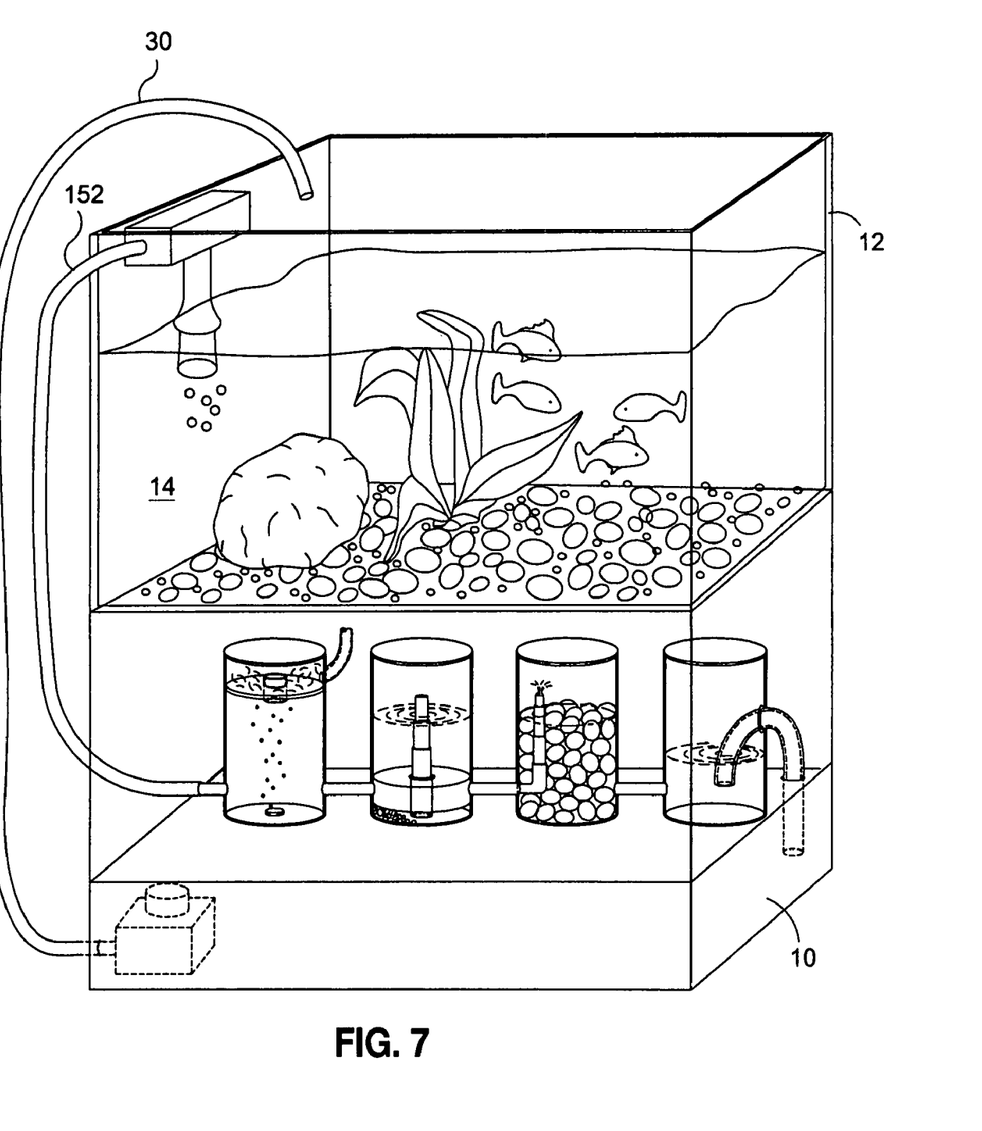
FIG. 7 is a perspective view of the filtration system installed below the aquarium, where a sump pump-based replenishment modality is utilized.
Figure 8:
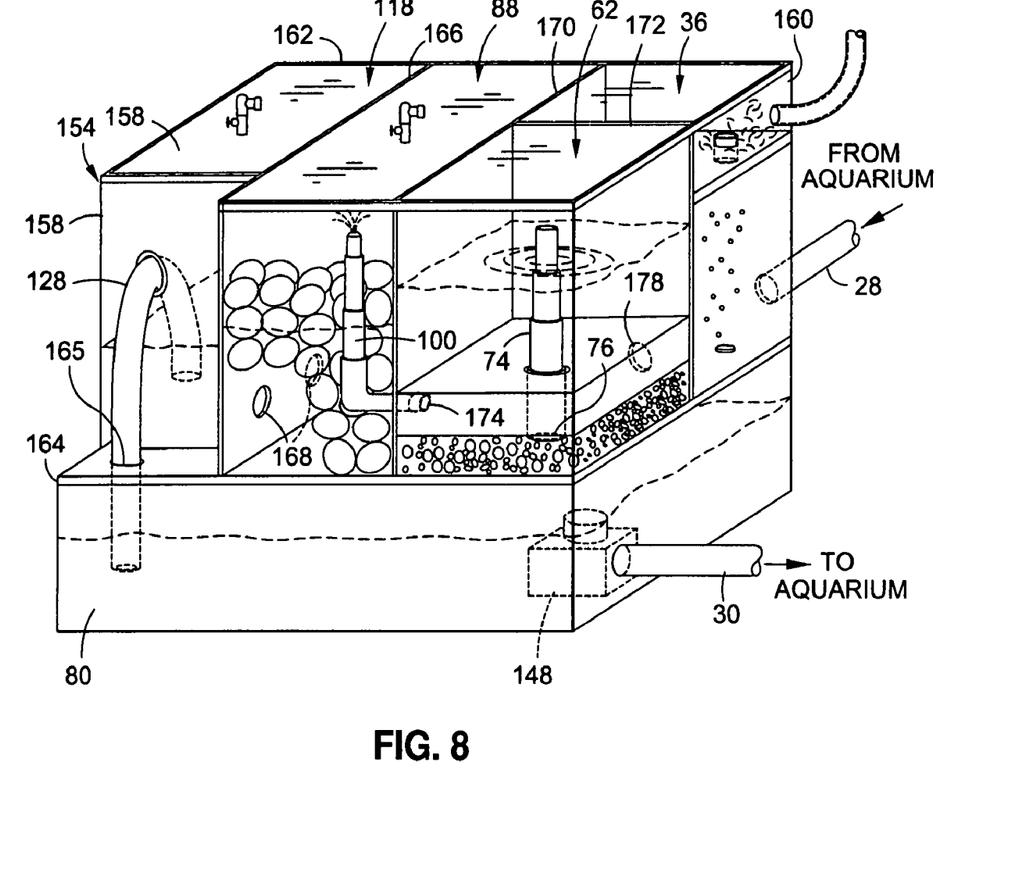
FIG. 8 is a perspective view of the filtration system in accordance with a second embodiment of the present invention.

A number of different configuration variations are contemplated with respect to the positioning of the filtration system 10 and the need for the sump pump 148. In the embodiment shown in FIG. 6, the catch basin 80, as well as the remainder of the filtration system 10, is disposed above the aquarium 12. The pump 24 circulate the unprocessed water 14 from the aquarium 12 and to the filtration system 10 as described above, while the processed water 14 in the catch basin 80 is transported back to the aquarium 12 by gravitational force via an inlet 150. Alternatively, as shown in FIG. 7, the catch basin 80 is disposed under the aquarium 12, and the unprocessed water 14 is transported to the filtration system via gravitational force, preferably by a siphon conduit 152. The processed water 14 stored in the catch basin 80 is pumped back to the aquarium 12 via the sump pump 148 over the incoming conduit 30. Furthermore, the filtration system 10 may be attached to a back side of the aquarium 12. In such a configuration, it is understood that the pump 24 provides sufficient motive force to transport the unprocessed water 14 to the filtration system 10, and the sump pump 148 provides sufficient motive force to transport the processed water 12 back to the aquarium 12, where gravitational force is otherwise inadequate. Prior to being transferred back to the aquarium 12, there may be additional filtering mechanisms that further process the water 14.

Figure 9:
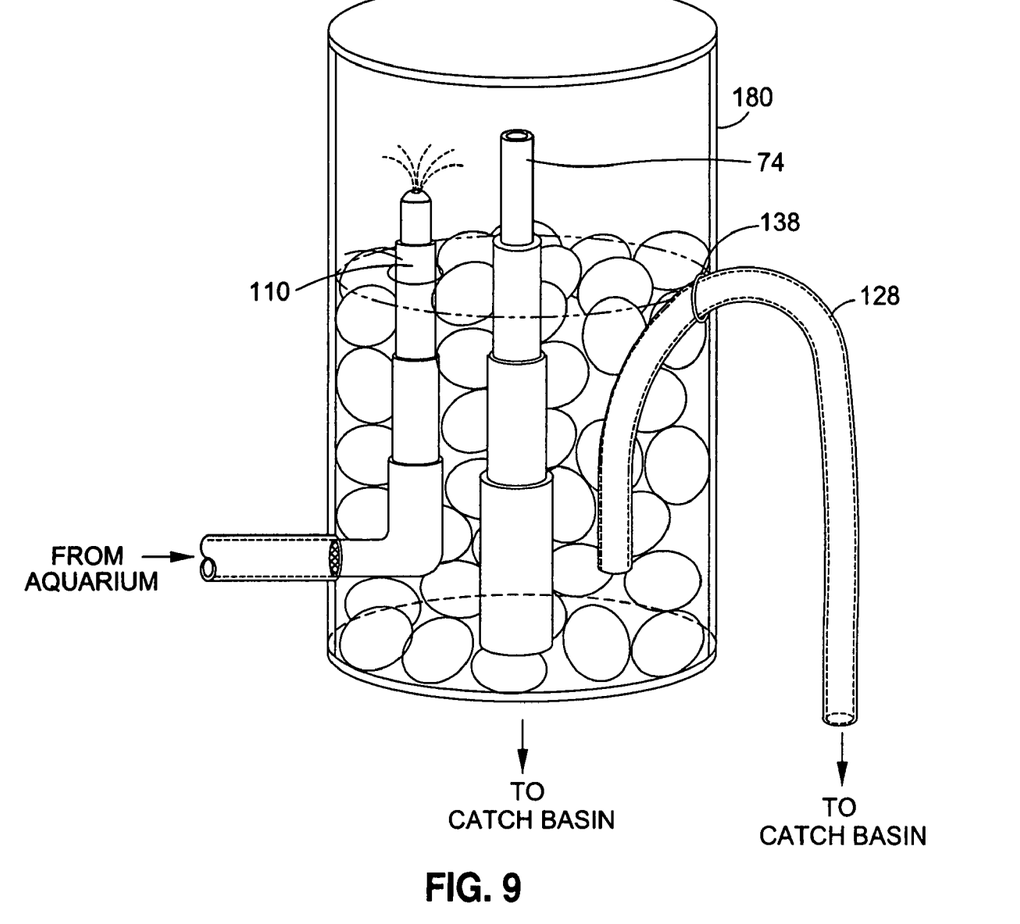
FIG. 9 is a cross-sectional view of the filtration system in accordance with a third embodiment of the present invention, including integrated siphon conduit, gate conduit, and overflow conduit.

Although the filtration system 10 has been illustrated and described in terms of discrete columns comprising the protein skimmer 36, the overflow chamber 62, the gate chamber 88, and the siphon chamber 118, alternative arrangements thereof are also contemplated and deemed to be within the scope of the present invention. With reference to FIG. 9, the filtration system 10 is a unitary structure or tank 154 with segregated compartments corresponding to the above-described protein skimmer 36, the overflow chamber 62, the gate chamber 88, and the siphon chamber 118. Generally, the tank 154 is defined by a front wall 156, a left side wall 158, a right side wall 160, and a back wall 162. The catch basin 80 is segregated from the rest of the tank 154 with a horizontal divider 164, which defines a siphon hole 165. The siphon conduit 128 is linked to the siphon hole 165 and thus the catch basin 80, as indicated above. A first vertical divider 166 segregates the siphon chamber 118 and the gate chamber 88, and defines a plurality of connecting holes 168. The connecting holes 168 fluidly links the gate chamber 88 to the siphon chamber 118 as described above. A second vertical divider 170 segregates the gate chamber 88 from the overflow chamber 62 and the protein skimmer 36, and a third vertical divider 172 segregates the protein skimmer 36 from the overflow chamber 62. The gate conduit 100 extends into the gate chamber 88 and attaches to the second vertical divider 170. The second vertical divider 170 defines a gate pipe hole 174 in fluid communication with the gate conduit, and also defines a overflow linkage hole 178 that links the gate chamber 88 to the overflow chamber 62. As in the above-described embodiment of the overflow chamber 62, the overflow conduit 74 is fluidly coupled to the catch basin 80. The horizontal divider 164 defines an overflow hole 176, to which the overflow conduit 74 is linked.

Other variations in the configuration of the filtration system are also contemplated. For example, multiple siphon conduits 128 may be provided to increase the volume of the water 14 being cycled through the siphon chamber 118, or to increase the discharge rate. Additionally, the gate chamber 88 and the siphon chamber 118 may be integrated, or there may be multiple gate chambers 88.

As best illustrated in FIG. 9, it is contemplated that the overflow conduit 74, the gate conduit 100, and the siphon conduit 128 may be incorporated within a single chamber 180, with each functioning as described above. The gate conduit 100 receives the water 14 from the aquarium 12, and continues to fill the chamber 180 until the water level reaches the crest 138 of the gate siphon conduit 128. Thereafter, as explained above, the water 14 in the chamber 180 is discharged. In case the rate of discharge via the siphon conduit 128 is slower than the rate at which the water 14 flows into the chamber 180 via the gate conduit 100, the overflow conduit 74 acts as a drain to remove any excess and prevent overfill. According to one embodiment, the gate conduit outlet 102 is positioned above the crest 138.

As indicated above, each of the respective chambers may be variously sized and shaped for accommodating a wide range of aquarium sizes. Every such variation is deemed to be within the scope of the present invention. It is also contemplated that the filtration system 10 be constructed of any water-resistant material such as plastic, glass, or acrylic, like the aquarium 12 with which it is associated.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

What is claimed is:

1. A filtration system for an aquarium having an aquarium inlet for processed water and an aquarium outlet for unprocessed water, the filtration system comprising:
   a gate chamber including filtration media;
   a gate conduit defining a gate conduit outlet positioned within the gate chamber and a gate conduit inlet in fluid communication with the aquarium outlet;
   a siphon chamber fluidly coupled to the gate chamber;
   an siphon conduit having a siphon conduit inlet at a first elevation within the siphon chamber, a siphon conduit outlet at a second elevation below the first elevation, and a crest at a third elevation above the first elevation and the second elevation; and
   a catch basin in fluid communication with the siphon conduit for collecting the processed water from the siphon chamber.

2. The filtration system of claim 1, wherein the water from the aquarium collects within the gate chamber upon conveyance thereto via the gate conduit, the water level within the gate chamber being substantially equivalent to the water level within the siphon chamber.

3. The filtration system of claim 2, wherein:
   the water in the siphon chamber is discharged into the catch basin upon the water level in the siphon chamber surpassing the third elevation; and
   the water in the siphon chamber stops discharging into the catch basin upon the water level in the siphon chamber reaching a level lower than the first elevation.

4. The filtration system of claim 1, wherein the elevation of the gate conduit outlet in relation to the gate chamber is adjustable to control the volume of water being cycled through the filtration system.

5. The filtration system of claim 1, further comprising:
   a first adjustable one-way valve coupled to the gate chamber to create atmospheric pressure differentials therein to control the rate at which the water is cycled through the filtration system.

6. The filtration system of claim 1, further comprising:
   a second adjustable one-way valve coupled to the siphon chamber to create atmospheric pressure differentials therein to control the rate at which the water is cycled through the filtration system.

7. The filtration system of claim 1, wherein the filtration media is a plurality of bio-media elements that foster the growth of nitrifying bacteria thereon that deactivates nitrogen impurities in the unprocessed water collected in the gate chamber.

8. The filtration system of claim 1, further comprising:
   a sump pump disposed in the catch basin for transporting the processed water collected therein to the aquarium inlet;
   wherein the catch basin is disposed under the aquarium and the unprocessed water from the aquarium is transported to the gate chamber by gravitational force.

9. The filtration system of claim 1, wherein:
   the catch basin is disposed above the aquarium;
   the processed water from the catch basin is transported to the aquarium by gravitational force; and
   the unprocessed water from the aquarium is transported to the gate chamber by a pump.

10. The filtration system of claim 1, further comprising:
    an overflow chamber defining an overflow chamber inlet in fluid communication with the aquarium outlet and an overflow chamber outlet in fluid communication with the gate conduit; and
    an overflow conduit extending into the overflow chamber.

11. The filtration system of claim 10, further comprising:
    a filtration module contained within the overflow chamber for removing particulate matter from water flowing therethrough.

12. The filtration system of claim 10, further comprising:
    a buffering module contained within the overflow chamber for adjusting the chemical balance of water flowing therethrough.

13. The filtration system of claim 10, wherein the overflow conduit defines an overflow conduit outlet in communication with the catch basin and an overflow conduit inlet in communication with the overflow chamber.

14. The filtration system of claim 1, further comprising:
    a protein skimmer for removing organic contaminants in the unprocessed water, the protein skimmer being in fluid communication with the aquarium and the gate chamber.

15. The filtration system of claim 1, wherein the gate chamber, the siphon chamber, and the catch basin are segregated compartments in a unitary tank structure.

16. The filtration system of claim 15, wherein a bottom end of the siphon chamber defines an opening that is coextensive with the siphon conduit outlet.

* * * * *